Apr. 10, 1923.
A. VARAUD
1,450,996
TIME INDICATOR
Filed Aug. 11, 1920
8 sheets-sheet 1
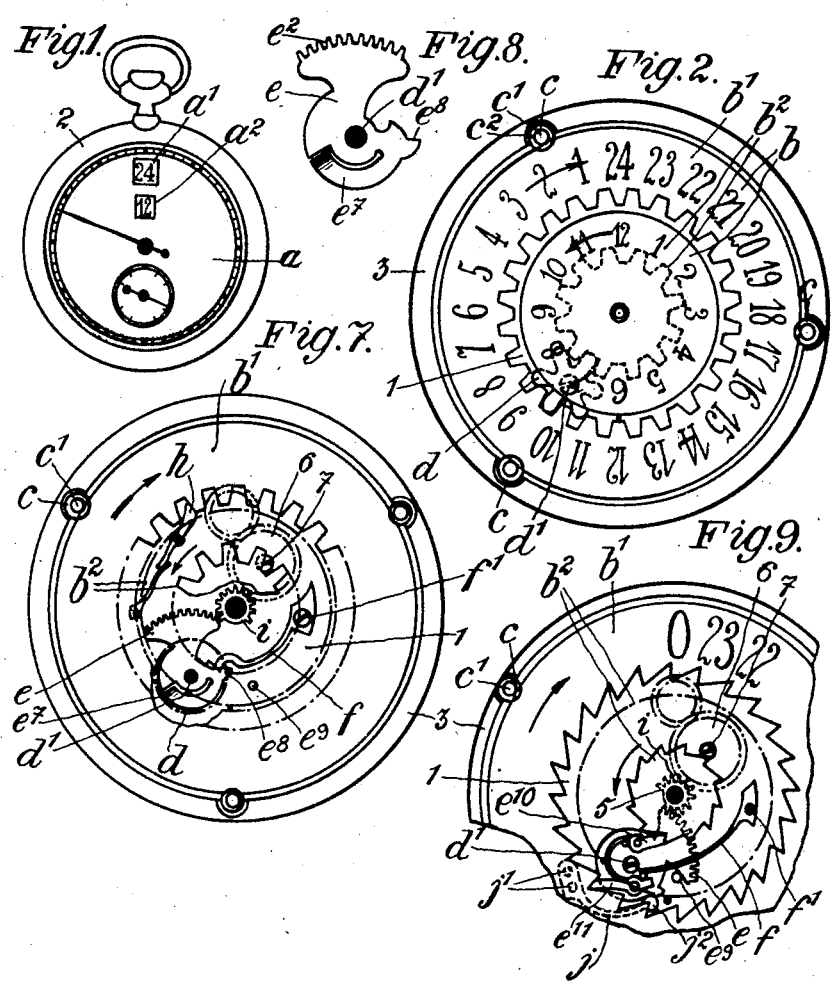

Apr. 10, 1923.
A. VARAUD
1,450,996
TIME INDICATOR
Filed Aug. 11, 1920
8 sheets-sheet 2
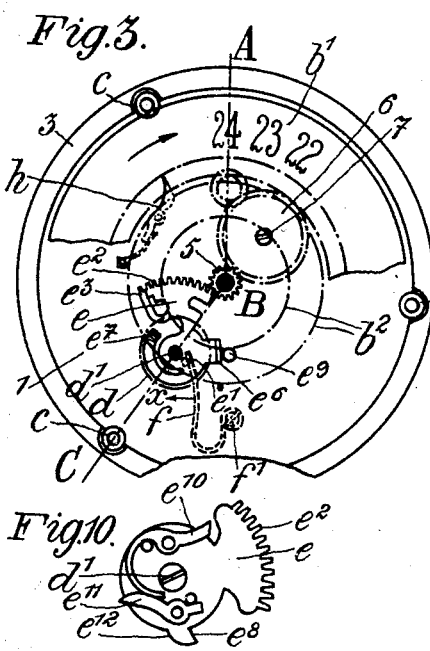
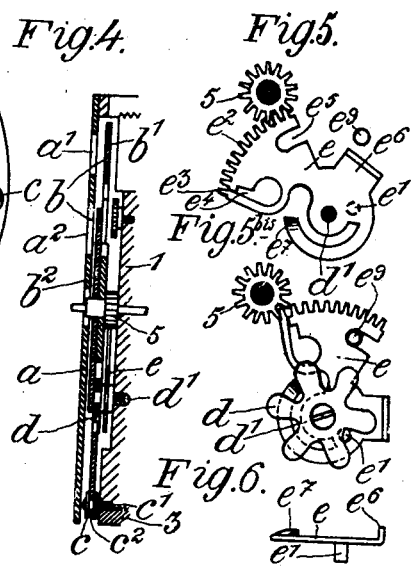

Apr. 10, 1923.
A. VARAUD
1,450,996
TIME INDICATOR
Filed Aug. 11, 1920
8 sheets-sheet 3
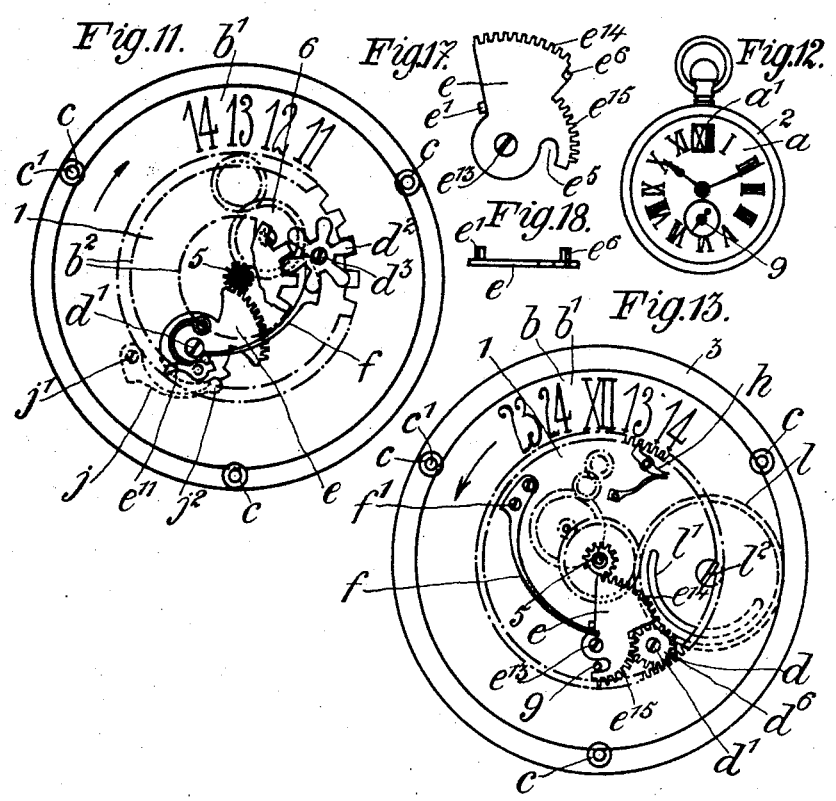
Inventor
André Varaud
By
his Attorneys

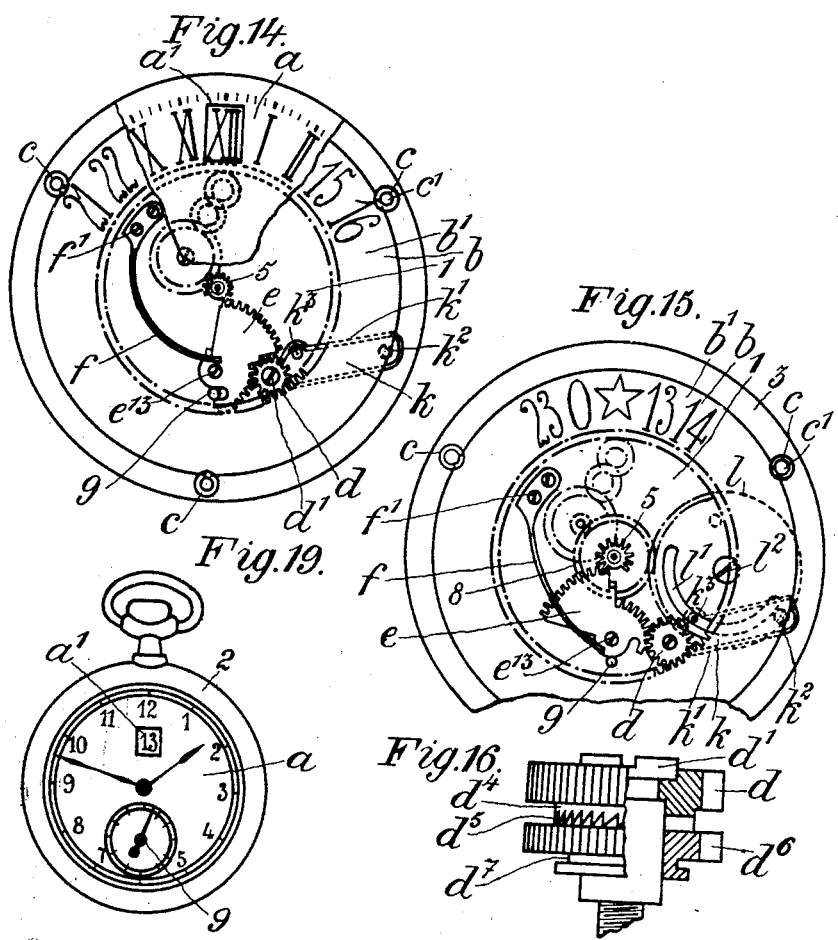

Apr. 10, 1923.  A. VARAUD  1,450,996
TIME INDICATOR
Filed Aug. 11, 1920  8 sheets-sheet 5

Inventor
André Varaud
By
his Attorneys

Apr. 10, 1923.
A. VARAUD
1,450,996
TIME INDICATOR
Filed Aug. 11, 1920
8 sheets-sheet 6
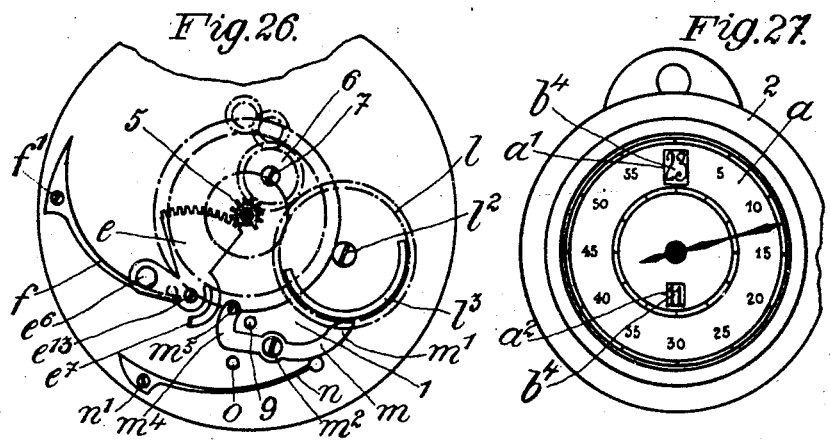

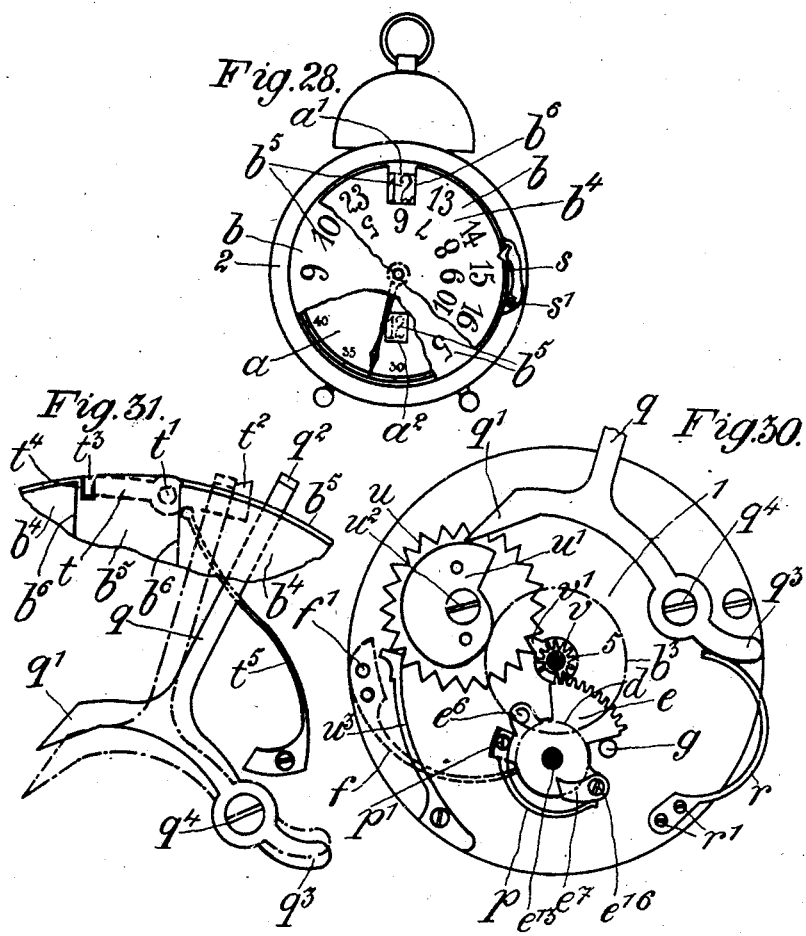

Apr. 10, 1923.

A. VARAUD 1,450,996

TIME INDICATOR

Filed Aug. 11, 1920

Inventor
André Varaud
By
his Attorneys.

Patented Apr. 10, 1923.

1,450,996

UNITED STATES PATENT OFFICE.

ANDRÉ VARAUD, OF GENEVA, SWITZERLAND, ASSIGNOR TO SOCIETE ANONYME D'HORLOGERIE ET BIJOUTERIE DE GENEVE, OF GENEVA, SWITZERLAND.

TIME INDICATOR.

Application filed August 11, 1920. Serial No. 402,920.

*To all whom it may concern:*

Be it known that I, ANDRÉ VARAUD, watchmaker, a citizen of France, residing at Geneva, Canton of Geneva, in the Confederation of Switzerland, have invented certain new and useful Improvements in Time Indicators (for which I have filed application in Switzerland March 29, 1919, Apr. 29, 1919), of which the following is a specification.

This invention has for its object a time indicator of the type in which a movable dial bearing chronometric indications arranged circularly moves always in the same direction under a fixed dial having at least one opening in it.

This invention is represented in the accompanying drawings which represent as examples thereof, several constructional forms, all adapted to already known sizes of watches, clocks or alarms.

Figures 1 to 11 relate to a first constructional form.

Figure 1 being a front elevation, natural size.

Figure 2 is the same elevation, the case and the fixed dial being removed, on the scale of 2, 1.

Figure 3 is the same elevation, a portion of the movable dial being also removed.

Figure 4 is a transverse section taken on the front part of the dial plate, along the broken line A—B—C of Figure 3.

Figures 5, 5ª and 6 are detail views on a larger scale, showing the operating member of the movable dial.

Figure 7 is an elevation similar to Figure 3, of a first modification of this constructional form.

Figure 8 is a detail view showing detached the toothed sector employed in this modification.

Figure 9 is the same elevation as Figure 7 of a second modification.

Figure 10 is a detail view showing detached the sector of this modification.

Figure 11 is the same elevation as Figure 9 of a third modification.

Figures 12 to 30 relate to a second constructional form.

Figure 12 being a front elevation.

Figure 13 an elevation on a larger scale, the case and the fixed dial being removed.

Figures 14 and 15 are the same elevations, showing the operating member of the ring in its two extreme positions respectively.

Figures 16 to 18 are detail views showing, detached, the pinion and the operating sector for the ring respectively.

Figure 19 is an elevation of a first modification of this constructional form.

Figure 20:
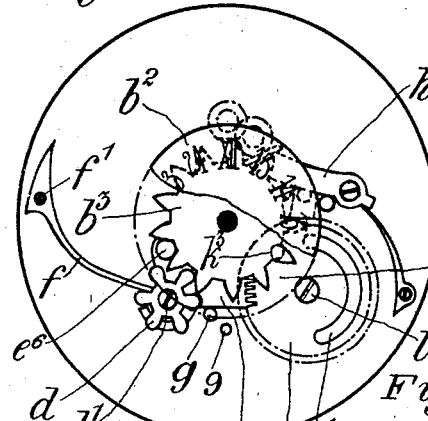

Figure 20 is an elevation of this modification on a larger scale, the case and the fixed dial being removed.

Figure 21:
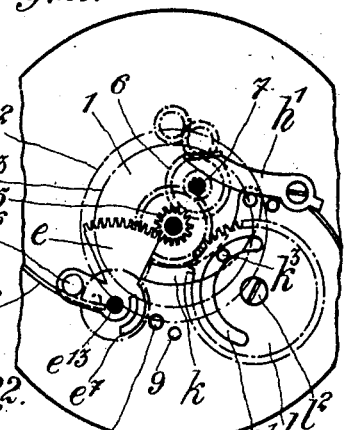

Figure 21 is the same elevation, the movable dial and the wheel integral therewith being removed.

Figure 22:
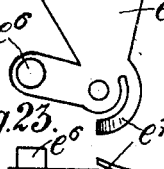

Figures 22 and 23 are detail views showing detached, in elevation and in plan the sector employed in this modification.

Figure 24:
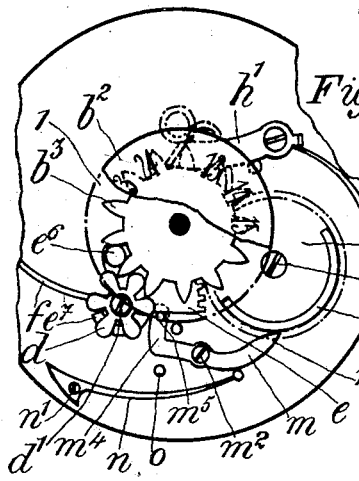

Figure 24 is an elevation similar to Figure 20 of a second modification of this second constructional form.

Figure 25:
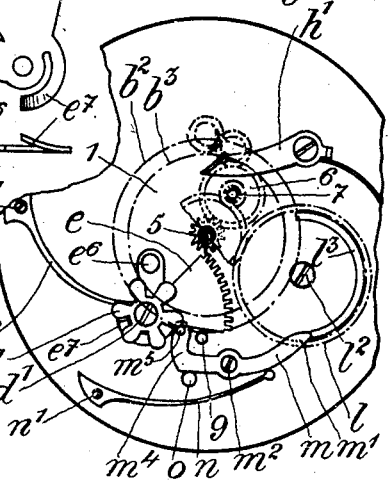

Figures 25 and 26 are elevations of this second modification, similar to Figures 14 and 15, the movable dial being completely removed.

Figure 27 is an elevation on a reduced scale of a third modification of this second constructional form applied to a clock.

Figure 28 is an elevation thereof, the fixed dial and the movable dial being partly removed.

Figure 29:
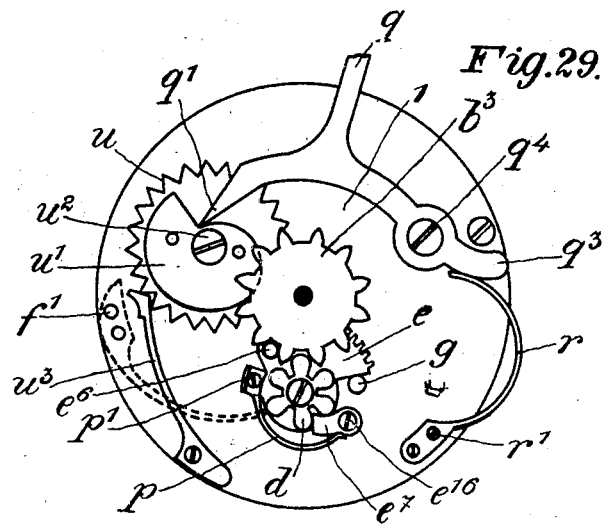

Figures 29 and 30 are two elevations thereof without dials, showing the lever in its two extreme positions.

Figure 31 is a detached view showing the detail of the working of the lever.

The first constructional form (see Figures 1 to 11) represents the arrangement according to the invention adapted to the front surface, specially prepared for this purpose, of the dial plate of an ordinary sized watch without its being necessary to make any change in the case 2.

The fixed dial $a$ only bears the indications of minutes and seconds in the usual manner. At the place which ordinary shows 12 o'clock is made an opening $a^1$, and between the centre of the dial and this opening there is a second opening $a^2$ similar to the first one. Behind the opening $a^1$ appear successively and intermittently every 60 minutes, hourly indications numbered from 1 to 24 and arranged radially on a movable ring $b^1$. Behind the opening $a^2$ appear in the same manner and simultaneously, hourly indications numbered 1 to 12 to give the old notation of the hours. These are arranged radially on a disc $b^2$ mounted freely on the cannon pinion. This ring $b^1$ and this disc $b^2$ are arranged in the same plane and constitute the movable dial $b$. The ring $b^1$ can rotate upon itself in the interior of the dust trap ring or enlargement ring 3, on three rollers, arranged at an angle of 120° in three semicircular notches in the dust trap ring 3. These rollers turn on supporting screws $c^1$, screwed to the edge of the plate $i$, and have a peripheral groove $c^2$ which serves to keep the ring $b^1$ in place and guide it in its rotary movement on itself. The ring $b^1$ has on its inner circumference 24 teeth slightly bent back on the side of the plate $i$. These internal teeth are in constant engagement with a pinion $d$ with six teeth, mounted freely on a carrier screw $d^1$, screwed into the plate $i$. This pinion gears diametrically into a series of 12 external teeth on the disc $b^2$. Under this pinion $d$ there likewise rocks about this carrier screw $d^1$ a toothed sector $e$ (shown detached in Figures 5 to 6). On its rear face this sector carries a perpendicular pin $e^1$, which engages in a mortise made in the thickness of the plate $i$ and is subjected to the action of a spring $f$ fulcrumed around a screw $f^1$ and seated in the lower part of the plate $i$. This spring acts in the direction of the arrow $x$ (see Figure 3). This sector $e$ carries a series of teeth constituted by 10 fixed teeth $e^2$ and a movable tooth $e^3$, made flexible by a cut-out portition $e^4$. The purpose of this flexible tooth is to permit of a rearward movement of the cannon pinion. It might be replaced by an elastic stop formed by a spring bent to a right angle at one of its ends. It carries also on the side opposite to this movable tooth a circular notch $e^5$, into which enters a stop $e^8$, projecting from the surface of the plate $i$. This sector $e$ also carries an arm bent at a right angle $e^6$, intended to prevent the ring $b^1$, when it is operated by the pinion $d$, from making more than 1/24th of a revolution on itself. It carries finally a spring pawl $e^7$, cut out circularly round the screw $d^1$, the free end of which projects at right angles from the surface of the sector $e$, so as to engage with the sharp angled teeth of the pinion $d$ when the sector $e$ turns in the same direction as the hands of a watch.

The sector $e$ thus formed and mounted freely on the carrier screw $d^1$ between the plate $i$ and the pinion $d$, gears with the cannon pinion 5. This cannon pinion 5 has 14 teeth which gear in the usual manner with the hour wheel 6. Three of these teeth are cut to the height at which they engage with the sector $e$, so as to permit it to escape the teeth of the cannon pinion, and returns to itself when it reaches the position shown in Figure 5 under the action of the spring $f$. It is stopped in this return movement by the stop $e^9$ when the movable tooth $e^3$ enters into engagement with the cannon pinion 5 (see Figure 5$^a$) so as to ensure the engagement being resumed when the first tooth which is not cut away on the cannon pinion comes opposite the tooth $e^3$. This tooth is made flexible, in order to permit of a rearward movement of the cannon pinion when setting it back to time. It must be made of some metal treated in such a way that it always returns to its original position.

It is obvious that this operation of setting the mechanism back to time by causing the cannon pinion to turn contrary to the hands will only act on the minute hand, since the sector $e$ will remain stationary being prevented from moving in one direction by the stop $e^9$ and held in the other by the spring $f$, which offers a much greater resistance than the flexible tooth $e^3$. To set the ring $b^1$ to time only the positive setting of a mechanism can be employed.

When it is situated in the position represented (see Figure 5$^a$) the bent arm $e^6$ of the sector $e$ is engaged between two teeth of the ring $b^1$ which prevents it from moving. In order that this ring shall remain stationary during the whole of the travel of the sector $e$ when it is driven by the cannon pinion 5, even when it is disconnected from this bent arm $e^6$, a spring catch or pawl $h$ is provided the elastic force which must be small with respect to that of the spring $f$, but yet sufficient to overcome the friction of the sector $e$ moving under the pinion $d$.

The cannon wheel which commonly carries the hour hand being dispensed with, the pinion which drives it is likewise done away with and the hour wheel 6 is mounted freely on a carrier screw 7.

The working of this constructional form is as follows:

The cannon pinion making one complete revolution per hour in the direction of the hands of a watch, will gear with the sector $e$, which it will drive, thus compressing the spring $f$ as long as its teeth which are not cut remain in engagement with it. At the expiration of the 60th minute, the last of these teeth will quit the sector $e$ which, under the action of the spring $f$ will then abruptly resume its original position. In this movement the spring pawl $e^7$ will drive the pinion $d$, which will then cause the ring $b^1$ and the disc $b^2$ to describe simultaneously an arc of an angle calculated exactly at 15° for the ring $b^1$ and 30° for the disc $b^2$.

The watch, instead of giving the indications 24 and 12 of the new and the old notation (see Fig. 1) will then give the indication 1 in the two openings $a^1$ and $a^2$.

While the three cut teeth of the cannon pinion are then passing the flexible tooth $e^3$ the ring $b^1$, the disc $b^2$, the pinion $d$ and the sector $e$ will remain stationary, the ring by the bent arm $e^6$, the disc by the pinion $d$ in constant engagement with the teeth of the ring $b^1$ and the sector by the spring $f$. When the first uncut tooth of the cannon pinion engages with the flexible tooth $e^3$, there will be a resumption of engagement between the cannon pinion and the sector, and so on.

Figs. 7 and 8 represent a first modification of this constructional form in which the sector $e$ is simplified. In this modification the spring $f$ is fixed to a screw $f^1$ directly on the plate $i$. In place of being supported on a pin its free end bears on a cam $e^8$ carried by the sector $e$.

The spring pawl $e^7$ is of slightly different form. Furthermore, in place of cutting away three teeth of the cannon pinion there is used in this modificaion a pinion $i$ which lacks three teeth.

Figs. 9 and 10 relate to a second modification in which the teeth of the ring $b^1$ and of the disc $b^2$ are in the form of a wolf's tooth and in which the pinion $d$ is replaced by two pawls $e^{10}$ and $e^{11}$ diametrically opposite and cogging respectively the disc $b^2$ and the ring $b^1$. In this modification, in order to avoid the sector striking too abruptly on the stop $e^9$ when it is quitted by the pinion $i$ carried by the cannon pinion there is provided a spring $j$ screwed to the plate $i$ at $j^1$, which bears towards the end of the return stroke of the sector $e$ on the inclined plane $e^{12}$ of the cam $e^8$ and which likewise permits of a rearward movement of the cannon pinion.

Finally, in this modification, the ring $b^1$ carries hour indications numbered from 0 to 23 to correspond to the indications of the railway or other official indicators.

Fig. 11 represents a last modification of this constructional form in which the sector $e$ only carries the pawl $e^{11}$ which cogs the ring $b^1$, the simultaneous driving of the disc $b^2$ being obtained by means of a pinion $d^2$ mounted freely on a carrier screw $d^3$, screwed into the plate $i$.

The disc $b^2$ and the corresponding opening $a^2$ used in the majority of the constructional forms hereinbefore described, to give the old notation of the hours from 1 to 12, may be dispensed with. The indication of the old notation would then be effected by means of the ordinary hour hand, the cannon wheel being retained, as well as the hour division of the fixed dial.

From midnight to noon, the hour would thus be indicated simultaneously by the figures appearing at the opening $a^1$ and by the hour hand, while from noon to midnight the opening would give the new notation of the hours, that is to say the indications 13 to 24 (or 13 to 23 and 0) and the hour hand the old notation corresponding from 1 to 12.

The disc $b^2$, instead of being mounted freely on the cannon pinion 5 might be also made integral with the hour wheel so as to be subjected to a uniform movement causing it to make one revolution on itself in 12 hours. The opening $a^2$ would then be of the minimum size of two indications of the disc $b^2$ and carry at its centre an index. The indication of the old notation of the hours from 1 to 12 would then be given by the relative position of this index of the indications 1 to 12 of the disc $b^2$ appearing and disappearing at the opening $a^2$.

The sector $e$ might also carry only the pawl $e^{10}$ and it would then be the toothed disc $b^2$ which would drive the ring $b^1$ through the medium of the pinion $d^2$.

The number of teeth in the cannon pinion 5 and in the sector $e$ might be different.

The flexible tooth $e^3$ might be replaced by a tooth acting as a pawl under the action of a spring and oscillating on the sector $e$.

In place of being bent at a right angle the arm $e^6$ of the sector $e$ might carry a perpendicular pin.

On the other hand a similar sector $e$ might be employed in order to operate at each revolution of the pinion for the seconds a disc member or ring bearing minute indications numbered from 0 to 59. This is particularly the case in alarm clocks, pendulum clocks and large clocks where there is more space available.

Furthermore the pinion $d$ might drive only one wheel of 24 teeth moving freely round the cannon pinion, which would carry integrally a disc of large diameter having two concentric graduations of four indications numbered from 1 to 24 (or 0 to 23) and from 1 to 12, this latter being arranged in a half circle, diametrically opposite the indications 13 to 24 of the other.

In the second constructional form (shown in Figs. 12 to 30) of the arrangement according to this invention applied to an ordinary sized watch, the hours, minutes and seconds are indicated in the usual way by the ordinary hands. Only in the place of the Fig. 12 (or XII) of the fixed dial $a$, there is made an opening $a^1$ through which can be seen from noon to midnight the hour indications numbered from 13 to 24, and in which is fixed an indication 12 (or XII) completing the dial, from midnight to noon.

These indications are carried radially by a movable dial $b$, constituted by a toothed ring, similar to that described in the constructional form hereinbefore given, which turns likewise on three rollers $c$.

This ring $b^1$ gears constantly with a pinion $d$ mounted freely on a carrier screw $d^1$. This pinion $d$ (see Fig. 16) carries at its rear part a series of teeth of wolf's tooth shape which engages vertically with the corresponding teeth $d^5$ of a pinion $d^6$ likewise mounted freely on the carrier screw $d^1$. While the pinion $d$ is kept always at the same height on this screw $d$ by means of a flute which enters into a corresponding groove in the screw, the pinion $d^6$ can slide on the bearing of this screw under the action of a flat spring $k$ the free end of which is forked and engages in a groove $d^7$ made in the hub of thin pinion $d^6$. This flat spring $k$ which thus controls the throwing into and out of operation of the two pinions $d$ and $d^6$ is fixed at its other end in a recess $k^1$ in the plate $i$ by means of a screw $k^2$. It is alternately held lowered during 11 consecutive hours, and liberated during the 13 hours following by a wheel $l$ which makes a complete revolution on itself in 24 hours by means of a tenon $k^3$ and a circular groove $l^1$ made in the wheel $l$ at an angle of 195°. This wheel $l$ oscillates freely about a screw $l^2$ screwed into the plate $l$ and gears with the cannon wheel 8, which, in the well known way with the hour hand which is fixed to it, makes one complete revolution in 12 hours.

The intermittent action of the ring $b^1$ takes place as in the preceding form by means of a sector $e$ mounted freely on the tension opening $f$ fulcrumed at $f^1$.

This sector $e$ has two series of teeth $e^{14}$ and $e^{15}$ gearing respectively with the cannon pinion 5, from which three teeth have been cut away or removed and with the pinion $d^6$. It also carries a circular notch $e^5$ for the purpose of making room for the pivot 9 of the seconds and as in the first constructional form, two stops $e^1$ and $e^6$ serving respectively as a fulcrum for the spring $f$ and a stop for the ring $b^1$, by being placed at the end of the stroke between two pinion teeth $d$.

It is operated in the manner described in the preceding form, alternately in one direction by the cannon pinion 5 and in the other by the spring $f$ every hour.

As it is in constant engagement with the pinion $d^6$, this is alternately driven each hour in the direction of the hands of a watch for 59 minutes 59 seconds and brought back suddenly in the reverse direction into its original position during the last second. The distance traversed during this latter movement must be calculated so as to cause the ring $b^1$ to accomplish 1/13th of a revolution on itself when the pinions $d^6$ and $d$ are thrown into gear. For example if the teeth on the ring $b^1$ were 91 in number, it would be necessary that it be moved then by 7 teeth.

The ring $b^1$ being held by a jumper $h$ will remain stationary and will hold the pinion $d$ stationary as long as the pinion $d^6$ is held out of gear by the action of the spring $k$ with the pinion $d$, and also while the sector accomplishes its stroke in the counter-clockwise direction when the pinion $d^6$ will slide like a pawl over the wolf's teeth $d^4$ of the pinion $d$ which will remain stationary.

The working of this constructional form will therefore be the same as that of the preceding form from noon to midnight as long as the indications 13 to 24 appear successively at the opening $a^1$. At the end of the next hour, that is at one o'clock in the morning, the ring $b^1$ will be again moved 1/13th of a revolution and the Roman figure XII will appear at the opening $a^1$. After this the spring $k$ being held lowered by the wheel $l$ during the 11 hours which follow, that is to say, from 1 o'clock to noon, the pinions $d$ and $d^6$ will be thrown out of gear and the ring $b^1$ consequently held stationary. The indication XII will remain stationary during this time at the opening $a^1$, thus completing the fixed dial $a$.

The hour indications on the ring $b^1$ are numbered 12 to 24, 12 being in Roman figures when the fixed dial carries Roman figures (see Figure 2). The indication 24 may be replaced by the indication 0 (see Figure 15) just as the Roman figure XII may be replaced by any kind of decorative pattern (see Figure 15).

The internal diameter of the ring $b^1$ is so calculated as to permit of the utilization of the seconds pivot 9 at its usual place.

In the modification of this second constructional form represented in Figures 19 to 23, the opening $a^1$ is arranged below the indication 12 on the fixed dial. The movable dial is constituted by a disc $b^2$ integral with a wheel with 13 teeth $b^3$ oscillating freely around the cannon pinion. The diameter of this disc is made small enough to permit of the use of the seconds hand 9.

The toothed wheel $b^3$ is in constant engagement with a pinion $d$, mounted freely on a carrier screw $d^1$, above the sector $e$ subjected to the action of a spring $f$. This latter gears with the cannon pinion with the incomplete teeth 5 by means of its teeth $e^2$, and has a stop pin arm $e^6$ and a spring pawl formed of a circular plate $e^7$ serving respectively as a stop at the end of the course of the wheel $b^3$ and to cog this wheel perpendicularly. A pawl $h^1$ prevents the wheel $b^3$ from turning backwards that is to say from turning in a clockwise direction and locks the pinion while the sector $e$ is wound up by the cannon pinion 5. The flat spring $k$ instead of throwing the two pinions into and out of gear directly cogs the sector $e$ when the tenon $k^3$ is in the groove $l^1$ in the wheel $l$. In this modification, this circular groove has only an angle of 165°.

During 11 consecutive hours the sector $e$ is thus locked, which also locks the dial as before. As soon as the tenon $k^3$ is lowered by the solid part of the wheel $l$, the free end of the spring $k$ will quit the sector $e$ and the action of the spring $f$ and the working of the movable dial will take place as in the preceding forms for 13 consecutive hours.

Figures 24 to 26 represent a second modification of this second constructional form, in which the wheel $l$, instead of a groove, has a circular cam of 165°, $l^3$, which acts on the end $m^1$ of a lever $m$, oscillating about a carrier screw $m^2$ and subjected to the action of spring $n$. The other end $m^4$ of this lever is bent and carries the stop $m^3$ of the sector $e$ which is thus movable and can take up two positions according as the lever $m$ is applied against a stop $o$ under the action of the spring $n$ (see Figure 25) or is actuated by the cam $l^3$ (see Figs. 24 and 26).

In the first position the teeth of the cannon pinion 5 and of the sector $e$ not being in engagement the movable dial is locked, while in the second position its action takes place as in the previous cases.

Figs. 27 to 30 represent on a reduced scale a third modification of this second constructional form applied to a large pendulum clock worked by any kind of motor i. e. by a spring, a weight, or electrically.

The fixed dial $a$ of this clock in which are made two openings $a^1$ and $a^2$ only carries the usual minute indications. The movable dial $b$ is constituted by two superposed discs $b^4$ and $b^5$. The disc $b^4$ arranged immediately under the fixed dial $a$ carries on its periphery a rectangular notch $b^6$ in the place of the hour indicator 12 of an external circular row of indications numbered from 13 to 23. An inner row of indications numbered from 0 to 11 is arranged concentrically on this disc $b^4$. The figures of the outer row are arranged radially with relation to the centre, while those of the inner row are arranged with relation to the periphery of the disc, the "0" of the latter being opposite the notch of the other and the "1" opposite the "13" and so on. The disc $b^5$, which is of slightly larger diameter than the disc $b^4$, has only one row of indications numbered from 1 to 12 and arranged radially so as to appear at the notch in the disc $b^4$. It is mounted freely with a toothed wheel $b^3$ with which it is integral on the cannon pinion and is actuated as hereinbefore described by a pinion $d$. The cogging device $e^7$ of this pinion to the sector $e$, instead of being a flat spring is, in this modification, an ordinary pawl pivoted at $e^{16}$ on a carrier screw screwed into an arm of the sector $e$ and subjected to the action of a spring $p$ fulcrumed at $p^1$ on a carrier screw screwed into an opposite arm of the sector $e$.

This disc $b^4$ is thus regularly moved by 1/12th of a revolution on itself every hour. From 1 o'clock in the afternoon up to 59′ 59″ it drives in its movements the disc $b^5$ so that the indication corresponding to the two ranges of indication of the hours on the disc $b^4$ then appear at the openings $a^1$ and $a^2$. This driving of the disc takes place notwithstanding the fact that a jumper $s$ fixed to the plate at $s^1$ tends to lock the disc $b^4$ by means of a rocking pawl $t$ pivoted at $t^1$ on the disc $t^5$ and subjected to the action of a spring $t^5$ which tends to hold its end bent into a right angle $t^3$ in a notch $t^4$ made in the periphery of the disc $b^5$. In this position the bent part $t^3$ bears on the left hand edge of the notch $b^6$ and this drives round the disc $b^4$.

From 1 o'clock in the morning up to 12 o'clock 59 minutes 59 seconds this disc $b^4$ is on the contrary locked by the jumper $s$ because the bent part $t^3$ of the pawl $t$ slides over the periphery thereof without driving it. This connection is obtained by means of the wheel $u$ with 24 teeth carrying integrally a snail $u^1$, and mounted freely on a carrier screw $u^2$ screwed into the plate 1 of the clock. This wheel is moved one tooth every hour by means of a finger $v^1$ carried by a disc $v$ integral with the cannon pinion 5. A jumper $u^3$ prevents the wheel $u$ from moving more than one tooth at a time. A lever $q$ with three arms $q^1$ $q^2$ $q^3$ in the form of an anchor is pivoted at $q^4$ and is subjected to the action of a tension spring $r$ fulcrumed at $r^1$. The arm $q^1$ in the form of a beak bears on the periphery of the snail while the arm $q^2$ carries on its end a part bent at a right angle which lowers a cam portion $t^2$ and causes the pawl $t$ to oscillate about $t^1$ so as to liberate the disc $b^4$ when the arm $q^1$ of the lever $q$ drops on to the starting point of the curve of the snail (see the position represented in Fig. 29).

The bent part $t^3$ driven by the disc $b^5$ slides then over the periphery of the locked disc $b^4$, without entering the notch $t^4$ until it arrives opposite the right hand edge of the notch $b^6$. At this moment the lever $q$ being raised by a snail leaves the passage open for the cam position $t^2$ of the pawl $t$, which can then oscillate under the action of the spring $t^5$ so that its bent part again enters into the notch $t^4$ thus cogging the disc $b^4$ when it bears on the left hand edge of the notch $b^6$.

Thus the hour indications 13 to 23 seen through the opening $a^1$ will be given by the disc $b^4$ of the movable dial simultaneously with the corresponding indications 1 to 11 of the old notation which will be seen at the opening $a^2$, while the indications 1 to 12 seen at the opening $a^1$ will be given through the notch $b^6$ by the disc $b^5$ simultaneously with the indication "0" which will be behind the opening $a^2$ 12 consecutive hours.

Having now particularly described and ascertained the nature of my said invention and in what manner the same is to be performed, I declare that what I claim is:

1. In a time indicator and in combination with a casing and a motor mechanism, a fixed dial having an opening therein, a movable dial having chronometric indications thereon visible successively through the opening in the fixed dial, a sector operated by the said motor mechanism and adapted to periodically operate the said movable dial by imparting a partial revolution thereto to bring the chronometric indications on the movable dial successively in position to be visible through the opening in the fixed dial.

2. In a time indicator and in combination with a casing and a motor mechanism, a fixed dial having an opening therein, a movable dial having chronometric indications thereon visible in turn through an opening in the fixed dial, a cannon pinion operated by the motor mechanism, a sector actuated by the cannon pinion, and a gear engaging with the movable dial and actuated by the sector for periodically imparting a partial revolution to the movable dial.

3. In a time indicator and in combination with a casing and a motor mechanism, a fixed dial having an opening therein, a movable dial having chronometric indications thereon visible in turn through an opening in the fixed dial, a cannon pinion, a sector actuated by the cannon pinion and having a tooth for yieldingly engaging the said cannon pinion, a gear meshing with the movable dial, and means actuated by the sector for periodically imparting a partial revolution to the said gear to correspondingly move the said movable dial.

4. In a time indicator and in combination with a casing, a fixed dial having an opening therein, a movable dial having chronometric indications thereon visible successively through the opening in the fixed dial, a gear engaging the said movable dial, a sector, means actuated by the sector for operating the said gear to actuate the said movable dial, and means for limiting the extent of movement of the said movable dial.

5. In a time indicator and in combination with a casing, a fixed dial having an opening therein, a movable dial having chronometric indications thereon visible successively through the opening in the fixed dial, a gear engaging the said movable dial, a sector, a pawl carried by the said sector and adapted to engage the said gear, and an arm carried by the said sector and adapted to engage the movable dial to limit the revoluble movement thereof.

6. In a time indicator and in combination with a casing and a motor mechanism, a fixed dial having an opening therein, a movable dial having chronometric indications thereon visible in turn through the opening in the fixed dial, a sector operated in one direction by the motor mechanism, a stop for limiting the extent of movement imparted to the sector by the motor mechanism, means for moving the sector in the opposite direction and normally maintaining the same in an initial position, a gear engaging the movable dial, a pawl carried by the sector and adapted to engage the said gear, and an arm carried by the said sector and adapted to engage the movable dial to determine the extent of each movement imparted thereto by the said sector and pawl through the said gear.

7. In a time indicator and in combination with a casing and a motor mechanism, a fixed dial having an opening therein, a movable dial having chronometric indications thereon visible successively through the opening in the fixed dial, a cannon pinion operated by the motor mechanism, a gear coacting with the said movable dial, a sector having a series of fixed teeth and a yielding tooth adapted to cooperate with the cannon pinion for moving the sector in one direction, a stop for determining the extent of the movement of the sector in this direction, a spring for moving the sector in the opposite direction and normally maintaining the same in an initial position, a pawl carried by the said sector and adapted to engage the said gear, and an arm carried by the said sector and adapted to engage with the movable dial to limit the extent of each movement imparted thereto through the said sector and gear.

8. In a time indicator and in combination with a casing and a motor mechanism, a fixed dial having openings therein, a revoluble dial, a revoluble ring, there being chronometric indications on the said dial and ring, a gear engaging both the said dial and the said ring, and means for periodically imparting a partial revolution to the said gear to correspondingly move the said dial and ring in order to successively bring the chronometric indications thereon into positions in which they are visible through the openings in the said fixed dial.

9. In a time indicator and in combination with a casing and a motor mechanism, a fixed dial having openings therein, a movable dial, a movable ring, there being chronometric indications on the said dial and ring, a gear meshing with both the said dial and ring, a sector, and means operated by the sector for periodically actuating the gear to impart partial revolutions to the said dial and ring.

10. In a time indicator and in combination with a casing and a motor mechanism, a fixed dial having a plurality of openings therein, a movable dial having chronometric indications thereon, a movable ring having chronometric indications thereon, a gear engaging the said dial and ring, a sector actuated in one direction from the motor mechanism, means for moving the sector in the opposite direction and yieldingly maintaining the same in an initial position, and means actuated by the sector for engaging and imparting a partial revolution to the said gear to correspondingly move the said dial and ring to successively bring the chronometric indications thereon into such positions that the same are visible through the openings in the fixed dial.

11. In a time indicator and in combination with a casing and a motor mechanism, a fixed dial having a plurality of openings therein, a movable dial having chronometric indications thereon, a movable ring having chronometric indications thereon, a gear engaging the said dial and ring, a sector, means for moving the same in one direction by the motor mechanism, a stop for limiting the movement of the sector in this direction, means for moving the sector in the opposite direction and yieldingly maintaining the same in an initial position, a device carried by the sector for engaging the said gear to periodically turn the same a partial revolution, and means carried by the said sector for engaging the said dial to limit each partial revolution imparted thereto.

12. In a time indicator and in combination with a casing and a motor mechanism, a fixed dial having a plurality of openings therein, a movable dial having chronometric indications thereon, a movable ring having chronometric indications thereon, a cannon pinion, a sector having a series of fixed teeth adapted to engage the cannon pinion and a yielding tooth also adapted to engage the cannon pinion whereby the sector is moved in one direction through the cannon pinion by the motor mechanism, means for moving the sector in the opposite direction and yieldingly maintaining the same in an initial position, a gear meshing with the said dial and ring, and a pawl carried by the sector and adapted to engage the said gear when the sector is returned to its initial position to impart a partial revolution to the said gear and a corresponding movement to the said dial and ring.

In testimony whereof I affix my signature in presence of two witnesses.

ANDRÉ VARAUD.

Witnesses:
 ROD. DE WURSTEMBERGER,
 THEODORE JIMER.